United States Patent Office 2,927,045
Patented Mar. 1, 1960

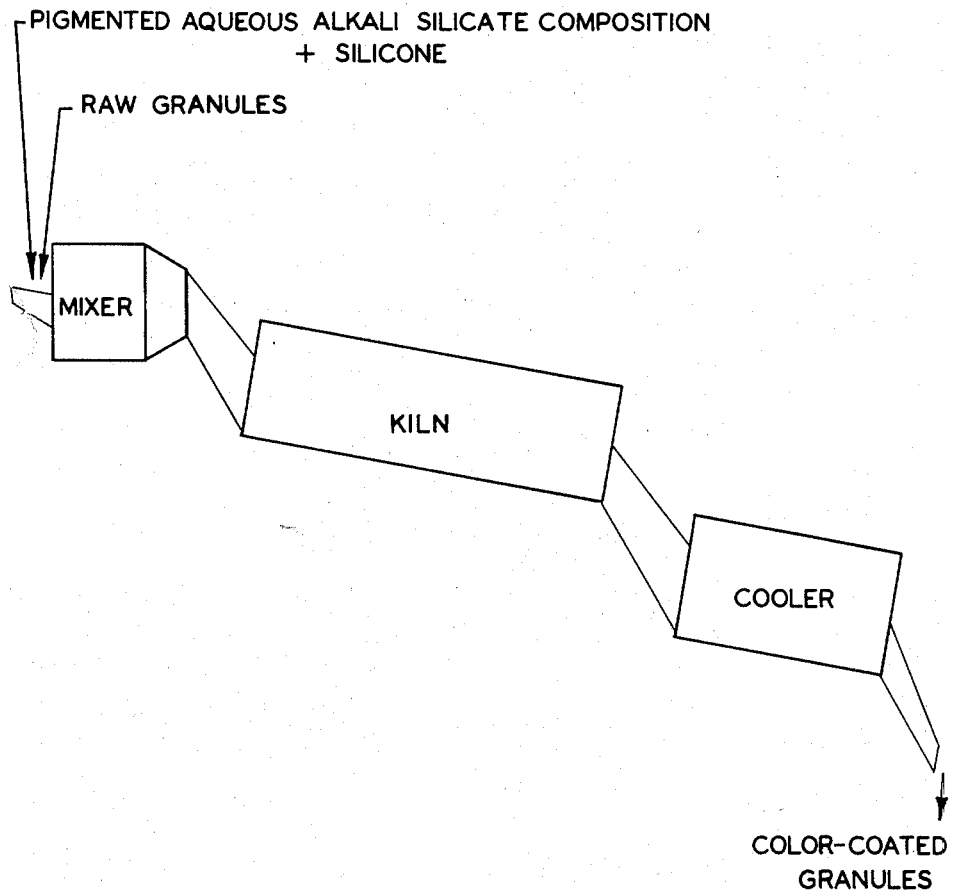

2,927,045

METHOD OF MAKING ARTIFICIALLY COLORED GRANULES AND PRODUCT THEREOF

James R. Lodge and Robert H. Fehner, St. Paul, Minn., assignors to Minnesota Mining and Manufacturing Company, St. Paul, Minn., a corporation of Delaware Application August 17, 1956, Serial No. 604,595

4 Claims. (Cl. 117—100)

This invention is concerned with the manufacture of artificially colored mineral granules and has particular reference to the manufacture of artificially colored roofing granules of high color intensity and with improved efficiency in the utilization of pigment components.

Artificially colored roofing granules are conventionally manufactured by coating mineral granules of desired size with pigmented aqueous alkali silicate compositions and then drying and insolubilizing the silicate binder. Rather small amounts of pigment and binder, of the order of 30–100 pounds per ton of granules on the dry basis, are found to produce colored granules which when viewed in bulk appear to be uniformly colored, even though under the microscope the coating is found to be essentially discontinuous.

Attempts have previously been made to improve the color intensity of such colored granules by increasing the amount of coating composition or binder, by applying the coating in multiple steps, and by other means. Such attempts have not been completely successful. Increasing the amounts of coating materials, and particularly the relatively expensive pigment components, disproportionately increases the cost of the product. Multiple coat-operations are often disadvantageous in view of the additional processing steps required and increased materials handling equipment needed.

The present invention overcomes these and other difficulties and disadvantages of previously proposed methods, and makes possible the attainment of increased color intensity as well as increased pigment efficiency. Colored granules are provided which are fully equal in bulk color to those made by previously known single coating methods while requiring substantially reduced amounts of pigment. Alternatively, colored granules may be produced by a single coating step with pigment content equal to that of prior art single coated granules but with significant improvement in color intensity. No additional processing is required. A further and unexpected advantage is a material improvement in the ability of certain of our novel granules to resist discoloration by oil.

These and other improvements and advantages are attained, in accordance with the present invention, by dispersing in the pigmented aqueous alkali silicate coating composition, prior to its application to the raw mineral granules, a significant small amount of a polymeric or polymer-forming organic silicon compound, i.e. a silicone. Referring to the accompanying drawing, wherein one form of our novel process is schematically shown in a general way, the silicone is first combined with the ingredients of the aqueous alkali silicate coating composition. In a mixer, for example in a tumbling-barrel type mixer, raw mineral granules are then coated with the thus formed coating composition, and dried therein to a free flowing state. The coated granules are then transferred to a kiln where they are fired and the color coatings thereof insolubilized. Following this the coated granules may be transferred to a rotary tube cooler wherein, all in accordance with conventional practice, they may be cooled by aqueous sprays and otherwise treated and completed as desired. Typical illustrative formulations and procedures will now be set forth in the form of specific but non-limitative examples.

*Example I*

| | Lbs. |
|---|---|
| Mineral granules (−10, +35 mesh greystone) | 2000 |
| Titanium dioxide | 30 |
| Kaolin | 32 |
| Sodium silicate solution (spec. grav. 1.48, $Na_2O:SiO_2$ ratio=1:2.84) | 65 |
| Water | 30 |
| Sodium methyl siliconate solution | 2 |

The sodium silicate and water were combined, and the siliconate, titanium dioxide and kaolin added in that order to form a slurry which was mixed with the granules, preferably previously warmed to about 200° F., in a tumbling-barrel through which a stream of air was continuously passed until the granules were thoroughly coated and dried to a free-flowing state. The granules were then fired in a rotary kiln for 20–25 minutes at about 950° F., and cooled in a rotary tube cooler, where they were lightly sprayed with a dilute aqueous solution of $AlCl_3$ and HCl to neutralize residual alkalinity and further insolubilize the colored coating and to assist in cooling the granules. A final treatment with about five pounds of light slate oil, to reduce dusting and promote adhesion by asphalt, completed the process. The resulting white granules appear on microscope examination to be surprisingly uniformly coated, and exhibited an opaque whiteness of extremely high intensity. On the basis of reflectance values obtained with a "Photovolt" reflectometer, these granules were some seven percent improved over granules prepared in identical manner except that the sodium methyl siliconate solution was omitted. In order to obtain an equivalent increase in reflectance value in the absence of the siliconate and by increasing the amount of pigment, it was found necessary to add about 10 lbs. of titanium dioxide, making a total of 40 lbs. or an increase of 33% in pigment content.

The aqueous sodium methyl siliconate solution contained about 31% of non-volatile material, corresponding to about 20% of methyl silicone $CH_3SiO_{1.5}$. Such a solution is available from the General Electric Company under the designation "SC–50." While the siliconate compound exists in aqueous solution, it appears to polymerize or be converted to a water-insoluble silicone during the drying operation. Dimethyl sodium siliconates, trisodium methyl siliconate, and other equivalent water-soluble organic silicon compounds are also useful.

*Example II*

In this example the formula and procedure employed were identical with those of Example I except that the water-soluble siliconate solution was replaced with 0.4 lb. of water-insoluble liquid silicone polymer which was mixed with and uniformly dispersed throughout the coating composition during the mixing and tumbling operation. The specific silicone employed was General Electric "SF–99" silicone polymer, having a specific gravity of 0.97–0.99, a viscosity of 4–30 centistokes at 100° F., and believed to be essentially an octamethylcyclotetrasiloxane.

The resulting white granules had a uniform coating over nearly their entire surface, and a reflectance value about 6½% higher than a control sample made in the absence of the silicone, requiring some 9 lbs. additional $TiO_2$ to duplicate in the silicone-free formulation.

Although the preceding examples have illustrated our invention in connection with the production of white artificially colored granules, it is by no means limited to granules of any particular type or hue of color-coating. Any type or color of pigment or mixture thereof, with or without clays, etc., can be employed with the small amount of silicone dispersed in the alkali silicate binder solution in forming the coating composition to be applied to the granules.

In general, we have found that those silicone compounds having a relatively low carbon to silicon ratio are most suitable in the preparation of white or light-colored granules.

Silicone compounds containing large numbers of long chain alkyl or aryl groups, and thus which have a high carbon to silicon ratio, tend to char slightly upon being heated to elevated temperatures making them less desirable where light-colored granules are to be prepared. Where such silicones are employed it is advisable to utilize them in the manufacture of darker colored granules where some amount of darkening is generally inconsequential. In any event, the surprising degree of granule surface coverage is achieved irrespective of the silicone employed.

Whether a given silicone will char upon being heated to the requisite temperatures, depending upon the granules to be prepared, can be easily ascertained by merely placing a small amount of the silicone on a glass slide and heating the same to said temperatures. Those silicones which show little or no darkening under such conditions have proved to be most desirable in the preparation of light-colored granules.

Some of the many silicones which we find most suitable for use in our procedures in addition to those specified in the examples hereof include the 100 percent solids silicone marketed by the Dow-Corning Corporation under the trade designation "Dow 200 Fluids" containing principally dimethyl-siloxane polymer and having viscosity of 100 centistokes at 25° C. and Dow-Corning "XEF 4010" a silicone-water emulsion containing a readily decomposable emulsifying agent. Others include General Electric "SM-70" and Dow-Corning "XS-2A" and "XS-1."

The amount of the silicone to be employed depends upon several factors including the particular silicone selected, and the amount and type of pigment materials to be employed, etc. In general, we have found that only very small amounts in the order of one-half pound per ton of granules or less, are necessary to the attainment of the objectives hereof. As additional amounts of the silicone are employed color intensity is further improved until at some maximum level, depending upon the particular silicone used, further improvement is not achieved. Thus some experimentation may be necessary to attain optimum results with each type of silicone employed, relative to the amount and type of pigments, binders, etc. utilized. However, it should be understood that in each instance where the proper materials are employed in accordance with the teachings hereof, our improved color-coated granules result.

The binder materials that we employ are for the most part water-soluble alkali silicates, preferably sodium silicate. It is necessary that solutions of these binders be maintained quite alkaline or gelation of the silicate occurs. Where such gelation occurs the silicate does not remain in solution, and the bond formed upon insolubilization of the binders is weak resulting in an inferior granule. We therefore preferably avoid using silicones which contain hydrolyzable strong acid-forming groups, such as chlorine or other halides, in the silicone molecule, which when hydrolyzed off the molecule form strong acids thereby lowering the pH of the coating composition. Since we utilize a dispersion of the silicone in aqueous silicate solution, when silicones having such acid-forming hydrolyzable groups are employed, their concentration must not be such that the net effect thereof upon hydrolysis is to cause gelation of the silicate.

The coatings of granules prepared in accordance with our teachings which are fired at relatively high temperatures (as were the granules described in the preceding examples) exhibit markedly different characteristics from those of prior art granules. For example, color intensity increase occurs which is unattributable even to the improvement due to increased granule surface coverage. Further, when slate oil or equivalent is added to the granules to reduce dusting and promote adhesion to asphalt, as is generally done, very little darkening due to oil absorption is observed, whereas substantial darkening occurs in the instance of granules identically prepared but to which no silicone has been added. The contrast is particularly noticeable in the case of granules colored by an ultramarine blue pigment. We feel that these differences in coating characteristics are in some manner connected with an unusual amount of intumescence which apparently occurs within the extremely thin coatings of our granules due to the presence of the silicone in the coating composition during firing of the granules.

This is not to say that the beneficial effects provided by our invention occur only in the instance of granules fired to a high temperature. The improved surface coverage and the desirable results produced thereby are achieved no matter in what manner, or at what temperature, the binder coating is insolubilized or made weather-resistant. It will also be appreciated that although we have described our invention for the most part in connection with single coating procedures, it is of course evident that, should it for some reason be desirable to do so, our procedures may as well be usefully employed in manufacturing operations where successive coatings are applied to the granules.

What we claim is as follows:

1. In the manufacture of artificially colored mineral granules having a pigmented insolubilized alkali silicate color coating of high color intensity and with improved efficiency in the utilization of pigment components, the method including dispersing a significant small quantity of a silicone in a pigmented aqueous alkali silicate color-coating composition, applying said composition to the raw granules, drying the coated granules to a free-flowing state, and then firing the coated granules.

2. The method of claim 1 in which the silicone is water-insoluble.

3. The method of claim 1 in which the silicone is water-soluble.

4. Artificially colored mineral granules having a high color intensity and prepared in accordance with the method of claim 1.

References Cited in the file of this patent
UNITED STATES PATENTS

| | | |
|---|---|---|
| 2,282,479 | Johnston | May 12, 1942 |
| 2,588,828 | Grenier | Mar. 11, 1952 |
| 2,595,465 | Keene et al. | May 6, 1952 |